UNITED STATES PATENT OFFICE.

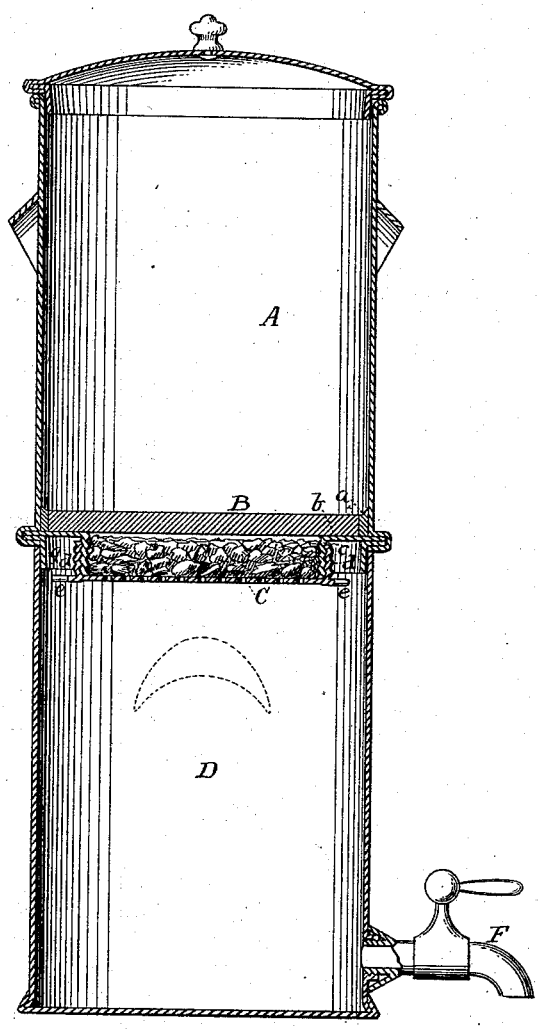

SAMUEL L. McBRIDE, OF ATLANTA, GEORGIA, ASSIGNOR TO McBRIDE & CO., OF SAME PLACE.

FILTER.

SPECIFICATION forming part of Letters Patent No. 268,702, dated December 5, 1882.

Application filed March 23, 1882. (No model.)

*To all whom it may concern:*

Be it known that I, S. L. McBRIDE, a citizen of the United States, and a resident of Atlanta, in the county of Fulton and State of Georgia, have invented a new and valuable Improvement in Filters; and I do hereby declare that the following is a full, clear, and exact description of the construction and operation of the same, reference being had to the annexed drawing, making a part of this specification, and to the letters and figures of reference marked thereon.

The figure of the drawing is a representation of a vertical sectional view of my improved filter.

This invention has relation to filters, and it consists in the novel construction and arrangement of parts, as will be hereinafter fully described, and particularly pointed out in the claims.

In the accompanying drawing, the letter A designates the upper compartment or vessel, into which the water which is to be filtered is poured. Within the wall of this upper vessel or compartment, near its lowest portion, is fitted a porous-stone base or partition, B, the edge of which is securely attached to the circumscribing wall, by means of water-proof cement, as indicated at $a$. The stone which is used for this filtering-partition is preferably porous limestone, which is sawed into flat pieces, which are cut to fit the vessel A neatly. Usually an internal annular ledge or bearing, $b$, is made around the wall of the vessel A, said ledge serving as a bearing for the stone and for the attachment of the purifier-chamber, C. For the latter purpose the ledge is made with a depending screw-flange, $c$, to which the raised screw-wall $d$ of the purifier-chamber is attached, the latter being turned by means of handles or studs $e$. The bottom of the purifying-chamber is made of perforated metal or wire-cloth. The purifying-chamber is designed to be filled with charcoal, through which the water passes after filtering through the stone B.

D represents the lower or receiving compartment or vessel, into which the water filters through the stone. Usually this chamber is made separate from the upper chamber, and supports the latter, which fits into its mouth, being provided with a depending flange, $g$, for this purpose. The lower vessel is provided with a discharge-faucet, F.

Having described this invention, what I claim, and desire to secure by Letters Patent is—

1. In a water-filter, the upper compartment or vessel, A, provided with the porous-stone base or partition, B, and the internal annular ledge, $b$, having the depending screw-flange $c$, the threaded raised wall $d$, having handles $e$, and a perforated bottom forming the purifier-chamber C, when connected to the screw-flange $c$, in combination with a lower vessel, D, having an outlet, F, substantially as specified.

2. A filtering-vessel having a porous-stone partition made of a single piece of natural stone, in combination with a purifying-chamber filled with charcoal and placed immediately beneath the partition, and a vessel or compartment for receiving the filtered water, provided with a suitable outlet for the same, substantially as specified.

In testimony that I claim the above I have hereunto subscribed my name in the presence of two witnesses.

SAMUEL LAUCHLIN McBRIDE.

Witnesses:
 D. O. DOUGHERTY,
 JAS. M. McAFEE.